United States Patent
McMahon et al.

(10) Patent No.: US 12,501,897 B2
(45) Date of Patent: Dec. 23, 2025

(54) METHODS OF USING NANOPARTICLES AND MICROPARTICLES FOR THE DISRUPTION AND PREVENTION OF BIOFILMS

(71) Applicant: Triangle Biotechnology, Inc., Chapel Hill, NC (US)

(72) Inventors: Joseph McMahon, Chapel Hill, NC (US); David Allison, Hillsborough, NC (US); Ricky McMahon, Chapel Hill, NC (US); Sandeep Kasoji, Durham, NC (US)

(73) Assignee: Triangle Biotechnology, Inc., Chapel Hill, NC (US)

(*) Notice: Subject to any disclaimer, the term of this patent is extended or adjusted under 35 U.S.C. 154(b) by 723 days.

(21) Appl. No.: 17/767,325

(22) PCT Filed: Nov. 6, 2020

(86) PCT No.: PCT/US2020/059486
§ 371 (c)(1),
(2) Date: Apr. 7, 2022

(87) PCT Pub. No.: WO2021/092443
PCT Pub. Date: May 14, 2021

(65) Prior Publication Data
US 2022/0369628 A1 Nov. 24, 2022

Related U.S. Application Data

(60) Provisional application No. 62/933,036, filed on Nov. 8, 2019.

(51) Int. Cl.
*A01N 25/28* (2006.01)
(52) U.S. Cl.
CPC .................................. *A01N 25/28* (2013.01)
(58) Field of Classification Search
CPC ....................................................... A01N 25/28
See application file for complete search history.

(56) References Cited

U.S. PATENT DOCUMENTS

| | | | |
|---|---|---|---|
| 8,067,117 B2 | 11/2011 | Goodenough et al. | |
| 9,427,410 B2 | 8/2016 | Dayton et al. | |
| 2005/0241668 A1 | 11/2005 | Trampuz et al. | |
| 2008/0237028 A1 | 10/2008 | Kislev | |
| 2008/0311540 A1* | 12/2008 | Gottenbos | A61C 17/20 433/86 |
| 2010/0269281 A1 | 10/2010 | Gottenbos et al. | |
| 2013/0336891 A1 | 12/2013 | Dayton et al. | |
| 2015/0252355 A1* | 9/2015 | Janzen | C12N 15/10 435/306.1 |
| 2018/0250031 A1 | 9/2018 | Mikus et al. | |
| 2019/0082615 A1 | 3/2019 | Santra et al. | |

FOREIGN PATENT DOCUMENTS

| | | | |
|---|---|---|---|
| CN | 110448702 A | 11/2019 | |
| WO | 2014055832 A1 | 4/2014 | |
| WO | WO-2017145118 A1 * | 8/2017 | A61L 2/025 |

OTHER PUBLICATIONS

Mandakhalikar, K.D., et al. "Extraction and quantification of biofilm bacteria: Method optimized for urinary catheters," Nature Scientific Reports 8:8069 (2018) 1-9. (Year: 2018).*
L. Fernández-Barat, et al. "Diagnostic Value of Endotracheal Aspirates Sonication on Ventilator-Associated Pneumonia Microbiologic Diagnosis," Microorganisms 2017, 5, 62, 1-13. (Year: 2017).*
"Extended European Search Report corresponding to European Application No. 20884089.2 dated Dec. 4, 2023".
Donlan, "Biofilms: Microbial Life on Surfaces", Emerging Infectious Diseases, vol. 8, No. 9, Sep. 2002, pp. 881-890.
Kasoji et al., Cavitation Enhancing Nanodroplets Mediate Efficient DNA Fragmentation in a Bench Top Ultasonic Water Bath, PLos One, 2015;10(7), (15 pages).
Lattwein et al., "An in vitro proof-of-principle study of sonobactericide", Scientific Reports, (2018) 8:3411 (12 pages).
PCT Written Opinion and International Search Report mailed Feb. 26, 2021 in corresponding PCT International Application No. PCT/US2020/059486 (11 pages).
Vögeling et al., "Synergistic Effects of Ultrasound and Photodynamic Therapy Leading to Biofilm Eradication on Polyurethane Catheter Surfaces Modified with Hypericin Nanoformulations", Mater Sci Eng C Mater Biol Appl. 2019;103:109749.

* cited by examiner

*Primary Examiner* — Michael P Cohen
(74) *Attorney, Agent, or Firm* — Myers Bigel, P.A.

(57) ABSTRACT

Provided according to embodiments of the invention are methods of disrupting, removing, and/or preventing biofilm formation on a surface. Such methods use compositions that include nanoparticles and/or microparticles that include an inert liquid and/or gas core surrounded by an enclosing substance. Further provided according to embodiments of the invention are methods for disrupting a biofilm to extract an analyte from a sample, methods of disrupting superficial dermal layers, and methods of disrupting, removing, and/or preventing biofilms in hydroponic systems, microbial fuel cells, and on agricultural products.

19 Claims, 1 Drawing Sheet

METHODS OF USING NANOPARTICLES AND MICROPARTICLES FOR THE DISRUPTION AND PREVENTION OF BIOFILMS

RELATED APPLICATIONS

This application is a 35 U.S.C. § 371 national phase entry of International Application No. PCT/US2020/059486, filed Nov. 6, 2020, which claims priority to U.S. Provisional Application Ser. No. 62/933,036, filed Nov. 8, 2019, the disclosures of which are hereby incorporated by reference in their entirety.

FIELD OF THE INVENTION

The present invention relates to methods of disrupting biofilms. Specifically, the present invention relates to methods of disrupting biofilms in biological specimens and on living and non-living surfaces, and methods of preventing or reducing biofilm formation. The present invention further relates to methods of disrupting superficial dermal layers for the purpose of exfoliation.

BACKGROUND OF THE INVENTION

Biofilms are a collection of microorganisms that attach to each other and onto surfaces, typically with an extracellular matrix composed of polysaccharides, DNA, proteins, lipids, and/or other components. Microorganisms in biofilms generally include bacteria, fungi, protists, and the like. Biofilms may form on devices and objects in home, industrial, environmental, or medical settings, and they may be difficult to remove by typical methods of cleaning or treatment. Furthermore, such biofilms may make such devices and objects unsuitable or undesirable for their intended use. Biofilms may also form in or on living matter, which may be deleterious to the health of the living system. Such biofilms may also make extracting biomolecules from biological specimens more challenging.

SUMMARY

Provided according to embodiments of the invention are methods of extracting an analyte from a sample containing a biofilm. In some embodiments, methods include contacting the sample with nanoparticles and/or microparticles, wherein the nanoparticles and/or microparticles comprise an inert liquid and/or gas core surrounded by an enclosing substance; applying a mechanical shearing technique to the sample to disrupt the biofilm; and extracting the analyte from the sample. In some embodiments, such samples include biological samples, industrial organic samples, and/or environmental samples.

Also provided according to embodiments of the invention are methods of disrupting a biofilm on a surface. In some embodiments, such methods include contacting the biofilm with nanoparticles and/or microparticles, wherein the nanoparticles and/or microparticles comprise an inert liquid and/or gas core surrounded by an enclosing substance; and applying a mechanical shearing technique to the biofilm to disrupt the biofilm. Surfaces include both living and non-living surfaces.

Also provided according to embodiments of the invention are methods of disrupting superficial dermal layers of skin in a subject. In some embodiments, such methods include contacting the skin with nanoparticles and/or microparticles, wherein the nanoparticles and/or microparticles comprise an inert liquid and/or gas core surrounded by an enclosing substance; and applying a mechanical shearing technique to the skin to disrupt the superficial dermal layers of skin.

Also provided are methods for reducing bacterial adhesion on a surface. In some embodiments, such methods include contacting the surface with nanoparticles and/or microparticles, wherein the nanoparticles and/or microparticles comprise an inert liquid and/or gas core surrounded by an enclosing substance; and applying a mechanical shearing technique to the surface to reduce or eliminate adhesion of bacteria on the surface. In some embodiments, the mechanical shearing technique produces micrometer or nanometer sized pores on the surface, which may reduce or eliminate bacterial adhesion on the surface. In some embodiments, the mechanical shearing technique produces inertial or stable cavitation of the nanoparticles and/or microparticles, which may reduce or eliminate bacterial adhesion on the surface.

DETAILED DESCRIPTION OF EMBODIMENTS OF THE INVENTION

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. The terminology used in the description of the invention herein is for the purpose of describing particular embodiments only and is not intended to be limiting of the invention. All publications, patent applications, patents and other references mentioned herein are incorporated by reference in their entirety. In case of a conflict in terminology, the present specification is controlling.

Also as used herein, "and/or" refers to and encompasses any and all possible combinations of one or more of the associated listed items, as well as the lack of combinations when interpreted in the alternative ("or").

Unless the context indicates otherwise, it is specifically intended that the various features of the invention described herein can be used in any combination. Moreover, the present invention also contemplates that in some embodiments of the invention, any feature or combination of features set forth herein can be excluded or omitted. To illustrate, if the specification states that a complex comprises components A, B and C, it is specifically intended that any of A, B or C, or a combination thereof, can be omitted and disclaimed.

As used herein, the transitional phrase "consisting essentially of" (and grammatical variants) is to be interpreted as encompassing the recited materials or steps and those that do not materially affect the basic and novel characteristic(s) of the claimed invention. Thus, the term "consisting essentially of" as used herein should not be interpreted as equivalent to "comprising."

It will also be understood that, as used herein, the terms "example," "exemplary," and grammatical variations thereof are intended to refer to non-limiting examples and/or variant embodiments discussed herein, and are not intended to indicate preference for one or more embodiments discussed herein compared to one or more other embodiments.

The term "about," as used herein when referring to a measurable value such as an amount or concentration and the like, is meant to encompass variations of ±10%, ±5%, ±1%, ±0.5%, or even ±0.1% of the specified value as well as the specified value. For example, "about X" where X is the measurable value, is meant to include X as well as variations of ±10%, ±5%, ±1%, ±0.5%, or even ±0.1% of X. A range provided herein for a measureable value may include any other range and/or individual value therein.

Nanoparticles and Microparticles

Provided according to embodiments of the invention are particles that may be used to disrupt or prevent biofilms in a variety of applications. The term "particle," as used herein, encompasses both "bubbles" and "droplets." The term "droplet." as used herein, refers to an amount of liquid, also referred to as a "core." that is encased or surrounded by a different, enclosing substance, also referred to as a "shell." The term "bubble," as used herein, refers to an amount of gas as the core, wherein the gas is encased or surrounded by the shell. In some embodiments, the core of the particle includes a metastable gas, and in some embodiments, the particle may include both liquid and gas therein. The term "particle" generally refers to a particle of any size, and thus, the term "particle" includes a microparticle and/or a nanoparticle.

As used herein, a particle that has a diameter greater than about 1 micron and less than about 1 millimeter is referred to as a microparticle. As such, in some embodiments, a microparticle may have a diameter in a range of about 1 micron to about 5 microns, about 1 micron to about 10 microns, about 1 micron to about 100 microns, about 1 micron to about 500 microns, or about 500 microns to about 1000 microns. In particular embodiments, microparticles may have a diameter of about 1, 2, 3, 4, 5, 10, 15, 20, 35, 30, 40, 50, 55, 60, 65, 70, 75, 80, 85, 90, 95 or 100 microns or any range defined there between. A particle that has a diameter of at least about 1 nanometer but less than one micrometer is referred to herein as a nanoparticle. As such, in some embodiments, nanoparticles may have a diameter in a range of about 1 nm to about 5 nm, about 1 nm to about 10 nm, about 1 nm to about 100 nm, about 1 nm to about 500 nm, or about 1 nm to about 999 nm. In particular embodiments of the invention, nanoparticles have a diameter of about 50, 100, 150, 200, 250, 300, 350, 400, 450, 500, 550, 600, 650, 700, 750, 800, 850, 900, or 950 nm in diameter or any range defined there between. In particular embodiments of the invention, nanoparticles have a diameter in a range of about 50 nm to about 500 nm. In some embodiments, a composition used in embodiments in the invention includes particles having an average particle diameter in any of the foregoing micron or nanometer lengths or length ranges.

In some embodiments of the invention, the core of the particle is an inert gas or liquid such as a fluorocarbon, a perfluorocarbon, a chlorofluorocarbon, a hydrofluorocarbon, a hydrocarbon, sulfur hexafluoride, a gas having a boiling point that is below room temperature (25° C.), or combinations of the above. Mixtures of liquid and/or gaseous compounds may also be used. In particular embodiments, the core of the particles include perfluorobutane, also referred to as decafluorobutane (DFB), and/or perfluoropropane, also referred to as octafluoropropane (OFP). In some embodiments of the invention, a compound in the core of the particles has a boiling point at or near body temperature. In some embodiments of the invention, a compound in the core of the particles has a boiling point in a range of about 40° C. to about 50° C. at atmospheric pressure. In some embodiments, a compound in the core of the particles has a boiling point in a range of about 30° C. to about 40° C. to at atmospheric pressure. In some embodiments, a compound in the core of the particles has a boiling point in a range of about 20° C. to about 30° C. at atmospheric pressure. In some embodiments, a compound in the core of the particles has a boiling point in a range from about 10° C. to about 20° C. at atmospheric pressure. In some embodiments, a compound in the core of the particles has a boiling point in a range of about 0° C. to about 10° C. to at atmospheric pressure. In some embodiments, a compound in the core of the particles has a boiling point in a range of about 10° C. to about 50° C. at atmospheric pressure.

In some embodiments of the invention, the nanoparticle or microparticle shell includes at least one of a lipid, phospholipid, protein, polymer, gel, surfactant, peptide, sugar, and the like. In some embodiments, the shell includes lung surfactant proteins and/or their peptide components. Examples of surfactants include amphiphilic polymers and copolymers, amphiphilic peptides, amphiphilic dendrimers, amphiphilic nucleic acids, and other amphiphiles. In particular embodiments, the shell is composed of a phospholipid such as 1,2-distearoyl-sn-glycero-3-phoshoryletha-nolamine (DSPE), a DSPE polyethylene glycol, or a mixture thereof.

The nanoparticles and microparticles of the invention are generally stable or metastable at the temperature of use (e.g., at room or body temperature) and as such, any gas or liquid in the core typically remains within the shell. However, once an "activating energy." such as a mechanical shearing force, is applied to the particle, the particles may activate, oscillate, cavitate, and/or vaporize. Specifically, without being bound to any theory, an activating energy such as a mechanical shearing force may cause the particle to compress and expand at the frequency of the energy. Under certain conditions, the expansion and compression of the particles may oscillate the particles sufficiently so that cavitation results. Further, under certain conditions, the oscillation and cavitation of the particles results in vaporization of the core and rupture of the particle shell. Under other conditions, the energy may result in inertial or stable cavitation whereby the particles oscillate but the shell remains intact.

In some embodiments, the particle is a droplet, and in particular embodiments, the particle is nanodroplet, and when activated, the liquid in the nanodroplet may expand and/or vaporize, thereby creating a bubble. In some embodiments, the bubble created upon vaporization is a microbubble and the shell expands with the vapor pressure of the expanding core. In some embodiments, the nano- or microbubble formed by the gas in the expanding core may rupture the shell, releasing inertial cavitation energy. In some embodiments, the expanding shell may not rupture and instead the bubble may oscillate in stable or inertial cavitation.

In some embodiments, the particle is a bubble, and in particular embodiments, the particle is a microbubble. In some embodiments, when activated, the bubble may oscillate with the frequency of the activation energy. In some embodiments, the oscillation or applied energy may cause a bubble to rupture, thereby releasing energy from the core.

As used herein, a particle is "activated" if the core of the particle interacts with the activating energy (e.g., sonication) so that the particle oscillates. In some cases, activation will lead to inertial or stable cavitation, liquid vaporization and/or rupture of the particle shell upon application of the activating energy. Such activating energy may include a mechanical shearing force such as rotary homogenization, and ultrasonic, X-ray, optical, infrared, microwave, or radio frequency energy. In some embodiments of the invention, the particles activate when treated with ultrasound at a frequency in a range of about 5 kHz to about 100 MHz, including in a range of about 10 kHz to about 90 MHz, a range of about 20 kHz to about 80 kHz, a range of about 30 kHz to about 70 kHz, and a range of about 40 kHz to about 60 kHz. Particular ranges include 5 kHz, 50 kHz, 100 kHz, 200 kH, 300 kHz, 400 kHz, 500 kHz, 1 MHz, 10 MHz, 20 MHz, 30 MHz, 40 MHz, 50 MHz, 60 MHz, 70 MHz, 80 MHz, 90 MHz, and 100 MHz, and any range defined there between. Whether a particle may be activated may depend on the temperature of the particle, and as such, in some embodiments, the particle is activatable at a temperature in a range of about 0° C. to about 50° C., such as a temperature in a range of about 10° C. to about 40° C. or in a range of about 20° C. to about 40° C., at atmospheric pressure.

Any method that produces a microparticle or nanoparticle, as defined herein, may be used to form the particles used in the methods described herein. Methods of making nanoparticles and/or microparticles of the invention may be found, for example, in U.S. Pat. No. 9,427,410, which is incorporated herein by reference in its entirety. A brief discussion of particular methods that may be used to form nanoparticles and/or microparticles used in embodiments of the invention is provided below.

In some embodiments, to form a particle, a first substance is enclosed by a second substance that acts as the shell, where the first substance includes at least one core compound. The core compound(s) may be condensed to a liquid phase. This may be done, for example, by cooling the core compound(s) to a temperature below the phase transition temperature of the compound having the lowest boiling point, by compressing the core compound(s) to a pressure that is above the phase transition pressure of the compound having the highest phase transition pressure, or a combination of the above. The core compound(s) may then be extruded into or in the presence of the shell material to create particles in which the core compound(s) is encapsulated by the shell material. In some embodiments, the core and shell of the particle are entirely or primarily in a liquid phase.

In some embodiments, the particles are extruded at a temperature below the phase transition temperature of the core compound having the lowest boiling point. In particular embodiments, the particles are formed through a flow-focusing junction in a microfluidic device, wherein the device is maintained at a temperature below the phase transition temperature of the core compound having the lowest boiling point.

In some embodiments of the invention, the particles are extruded in a pressurized environment, wherein the ambient pressure is above the phase transition pressure of the core compound having the highest phase transition pressure. In particular embodiments, the particles are extruded at a temperature that is either above or below the boiling point of the core compound having the lowest boiling point. In a particular embodiment, the particles are extruded at a temperature that is below the boiling point of the core compound having the lowest boiling point.

In some embodiments of the invention, the preparation of particles involves shaking. In one embodiment, the preparation involves extrusion through a filter. In some embodiments, the filter has a pore size greater than the size of the desired particle. In some embodiments of the invention, encapsulating particles of the liquid phase in the encapsulation material includes extruding or emulsifying the liquid, phase using a microfluidics technique to produce particles of the liquid phase and encapsulating the particles of the liquid phase in the encapsulation material. In some embodiments, such a device is maintained at a temperature below the phase transition temperature of the core compound having the lowest boiling point.

As a particular example, at least one core compound may be extruded into or in the presence of the shell material to create bubbles having an outer shell encapsulating the at least one core compound, at least some of which is in gaseous form. In some embodiments, the contents of the bubble are entirely or primarily in a gaseous phase. The bubble thus formed may be cooled and/or compressed such that the contents of the bubble reach a temperature below the phase transition temperature of the core compound having the lowest boiling point at that pressure. This causes the gas within the bubble to condense to a liquid phase, and thus, the bubble becomes a droplet. In this manner, particles in which the core compounds are encapsulated by the shell material are created. In some embodiments, when a bubble condenses to form a droplet, the size of the particle decreases. In some embodiments, condensation of the liquid results in a microbubble becoming a nanodroplet.

In some embodiments of the invention, creating bubbles of core compound(s) encapsulated in shell material includes extruding or emulsifying the gas in the presence of lipids. In one embodiment, creating bubbles of core compound(s) encapsulated in a shell material includes extruding or emulsifying the core compound(s) in a HEPES buffer. In particular embodiments, creating bubbles of core compound(s) encapsulated in a shell material includes extruding or emulsifying the core compound(s) in a buffer having a pH in a range from approximately 3 to 9.

In some embodiments of the invention, condensing the core compound(s) into a liquid phase includes cooling the bubbles under pressure until the encapsulated gas condenses into a liquid phase. In particular embodiments, the bubbles are cooled to a temperature in a range from about 0° C. to about 10° C., or about 0° C. to about 20° C. In particular embodiments, the bubbles are exposed to a pressure that is greater than about 10, 20, or 50 psi. In particular embodiments, the bubbles are exposed to a pressure that is in a range from approximately about 50 psi to about 100 psi. In particular embodiments, the bubbles are exposed to a pressure that is in a range of about 100 psi to about 200 psi. In particular embodiments, the bubbles are exposed to a pressure that is in a range of about 200 psi to about 500 psi.

For both the particle extrusion method and the bubble condensation method, in some embodiments, the core compound(s) may include a perfluorocarbon that has a phase transition temperature that is below room temperature or below human body temperature of 37° C. at normal atmospheric pressure. For example, the core compound(s) may include a highly volatile compound, such as perfluorobutane, perfluoropropane, a mixture of the two, or a mixture of perfluorobutane and/or perfluoropropane with another perfluorocarbon. The core compound(s) may also be a mixture of perfluorobutane and/or perfluoropropane with a third compound, where the third compound may or may not be a gas at room temperature or body temperature. In some embodiments, the shell material may be made up of lipids, proteins, polymers, a gel, a surfactant, a peptide, a sugar, another suitable encapsulating material, or a combination thereof. The resulting particles may be stable at room temperature/body temperature and pressure. Particles containing perfluorobutane, perfluoropropane, or a mixture of the two, may have an activation energy that is low enough for use in some or all of the methods described herein.

For example, particles containing perfluoropropane may have the desired low vaporization threshold, even when prepared as nanoparticles. Perfluorobutane's boiling point of −1.7° C. is significantly lower than many other commonly used perfluorocarbons, which allows vaporization at much lower pressures than similarly-sized emulsions of higher boiling-point perfluorocarbons. Lipid-encapsulated microparticles containing condensed perfluoropropane, which has a boiling point of −35° C., may be particularly stable. Exposing these particles to room temperature or body temperature may not by itself enough to cause them to activate, but the application of energy, such ultrasonic energy, may active the particles.

Compositions that include the nanoparticles and/or microparticles of the invention may vary depending on the application. The concentration of particles may vary depending on a number of factors, including the proposed use, the thickness, type, or quantity of the biofilm, the surface the biofilm to which the biofilm is attached, or other objects or specimens adjacent to or nearby the biofilm. In some embodiments of the invention, compositions include particles at a concentration in a range of about $1\times10^8$ particles/ml to about $1\times10^{12}$ particles/ml, including about $1\times10^8$ particles/ml, about $1\times10^9$ particles/ml, about $1\times10^{10}$ particles/ml, about $1\times10^{11}$ particles/ml, about $1\times10^{12}$ particles/ml, or any range defined there between. In some embodiments compositions include particles at a concentration in a range of about $1\times10^3$ particles/ml to about $1\times10^{10}$ particles/ml, including about $1\times10^3$ particles/ml, about $1\times10^4$ particles/ml, about $1\times10^5$ particles/ml, about $1\times10^6$ particles/ml, about $1\times10^7$ particles/ml, about $1\times10^8$ particles/ml, about $1\times10^9$ particles/ml, about $1\times10^{10}$ particles/ml, and any range defined there between. In some embodiments, compositions include particles described herein suspended in water or an aqueous buffer. In some embodiments, the aqueous buffer may further include additional components such as, for example, glycerol, propylene glycol, and/or a phosphate compound. More detail on the compositions will be provided with reference to the particular methods of the invention.

As used herein, "disrupting" the biofilm refers to any action of altering the structure of the biofilm, including decreasing the thickness, quantity, density, or quality of the biofilm. In some embodiments, disrupting the biofilm also kills some or all of the microbes (e.g., bacteria) in the biofilm.

As used herein, a "mechanical shearing technique" refers to any technique that provides a mechanical shearing force on the microparticles and/or nanoparticles. Examples include but are not limited to rotary homogenization and the application of ultrasonic energy. Other energy sources may also be used (e.g., X-ray, optical, infrared, microwave, or radio frequency energy) provided that they induce the appropriate mechanical shearing, oscillation, and/or cavitation effects. Samples can be sonicated indirectly, for example, by using a bath, cuphorn, or focused-type sonication device, or sonicated directly, such as by using a probe tip-type sonication device. In some embodiments, a small-scale ultrasonic transducer may be integrated into small form-factor devices (e.g., microfluidics, sample processing cartridges, etc.). Rotary homogenators are known in the art and any suitable device may be used, including a blender. In some embodiments, the rotary homogenizer may be handheld or part of a small form-factor device (e.g., microfluidics, sample processing cartridges, and the like).

Methods of Using Nanoparticles and/or Microparticles to Process Biological, Environmental, and Industrial Organic Samples Provided according to some embodiments of the invention are methods of extracting a biomolecule or other analyte from a biological, environmental, or industrial organic specimen (also referred to as a "sample") containing a biofilm. In some embodiments, the methods include contacting the sample with the nanoparticles and/or microparticles described herein; applying a mechanical shearing technique to the sample to disrupt the biofilm; and extracting the biomolecule or other analyte from the sample and/or detecting the biomolecule or other analyte in the sample. Such methods may be used in both clinical and non-clinical settings.

A number of different biological specimen types may be used in the methods described herein. The term "biological specimen" includes a substance from a living organism, including from humans, non-human primates, mammals (e.g., dogs, cats, horses, etc.), other non-mammal animals, microorganisms, and material from plants. Examples include but are not limited to cells, tissue, sputum, skin (e.g., open skin wound or skin bacterial infection), mucus, feces, slime, or surface sample (e.g., a surface of a plant). Environmental specimens include samples from the natural world including from water, soil, plants, and the like. Industrial organic specimens include, for example, slime, water (including environmental and waste water), and biofilm-containing matter from surfaces (e.g., inside of tanks and pipes) used in industrial processes.

In some embodiments of the invention, prior to contacting the biological, environmental, or industrial organic specimen with the nanoparticles and/or microparticles, the specimen may be prepared as a sample for treatment. Such preparation methods include, but are not limited to, suspension of the specimen in an aqueous solution in a tube(s), microtiter plate, PCR plate or any other type of vessel; culturing in a microtiter plate or any other type culture plate or sample vessel using growth media; or by inserting directly into a sample processing cartridge, chip, microfluidic device, and the like.

Next, the sample is contacted with the microparticles and/or nanoparticles, such as via addition of a composition including the particles to the sample. In some embodiments, the particles are present in an aqueous composition, such as an aqueous buffered solution. The concentration of the particles in the sample, or in a composition added to the sample, may vary depending on the nature of the sample, including the type of specimen, the thickness, type, and quantity of biofilm, and the identity and/or sensitivity of the other components in the sample. For example, some biofilms (e.g., biofilms with a significant number of gram positive bacteria or fungi) may benefit by the use of a relatively high concentration of nanoparticles and/or microparticles, while with other biofilms, lower concentrations of particles may be sufficient to adequately disrupt the biofilm. In some embodiments, the concentration of the particles in a sample is in a range of about $1\times10^8$ particles/ml to about $1\times10^{12}$ particles/ml. In some embodiments of the invention, the ratio of the particles to cells in a sample is in a range of about 1:1 to about 1:1000, including a range of about 1:1 to 1:500, a range of about 1:1 to 1:200, a range of about 1:1 to about 1:100, and a range of about 1:1 to about 1:20. The sample and the nanoparticles and/or microparticles may be combined or mixed in any suitable fashion. However, in some cases, the particles are added to the sample by pipetting a composition including the particles into the sample. In some embodiments, the sample and particles may be vortexed, but in some embodiments, no mixing of the particles with the sample is needed.

After contacting the sample with the nanoparticles and/or microparticles, a mechanical shearing technique is then applied to the sample and particles to disrupt the biofilm. The mechanical shearing may activate the nanoparticles and/or microparticles, whereby the particles may release inertial cavitation energy that may disrupt the biofilm. In some embodiments of the invention, the mechanical shearing technique includes sonification. In some embodiments, samples are sonicated indirectly, for example, by using a bath, cuphorn, or focused-type sonication device, or sonicated directly, such as by using a probe tip-type sonication device. In some embodiments, a small-scale ultrasonic transducer may be integrated into small form-factor devices (e.g., microfluidics, sample processing cartridges, etc.). In some embodiments of the invention, in addition to or in lieu of sonication, the mechanical shearing technique includes rotary homogenization.

The duration of the mechanical shearing may depend on the type of shearing used, the particular equipment used, the biofilm in the sample, and the type of sample. In some embodiments of the invention, mechanical shearing may be performed for a time in a range of about 1 second to about 60 minutes. In some embodiments, mechanical shearing may be performed for a time in a range of about 1 minute to about 40 minutes, and in some embodiments, for a time in a range of about 1 minute to about 20 minutes. In some embodiments of the invention, after mechanical shearing, the sample may then undergo post-processing cleanup and purification, for example, to isolate and/or detect the analyte in the sample. While any suitable analyte may be isolated or detected, in some embodiments, the analyte includes a biomolecule such as a nucleic acid, metabolite, protein, intra- or extracellular biomolecule for downstream analysis, a biomolecule from a microbe that forms a part of the biofilm, or any other biomolecule of interest. The sample can also be directly inputted into a diagnostic sensor or chip for the detection of one or more specific analytes. In some embodiments, once isolated, an analyte may be further processed to identify, manipulate, and/or modify the analyte.

Disrupting Biofilms on Surfaces and Preventing Biofilm Formation on Surfaces

Also provided according to embodiments of the invention are methods of disrupting, decreasing, and/or removing a biofilm on a surface. Such methods include contacting a biofilm on a surface with the nanoparticles and/or microparticles described herein; and applying a mechanical shearing technique to the biofilm to disrupt the biofilm. The nanoparticles and/or microparticles may be activated by a mechanical shearing technique and oscillated, cavitated and/or vaporized to release mechanical energy to disrupt the biofilm and/or kill at least some microorganisms within the biofilm. Optionally, additional cleaning and/or treatment of the surface may be performed to decrease or remove the biofilm. A wide variety of surfaces may be cleaned in such a manner. For example, in some embodiments, nanoparticles and/or microparticles, or a composition including nanoparticles and/or microparticles, may be used to remove or decrease a biofilm on at least one surface of a medical or non-medical instrument or device (or any object). In the medical field, such devices include, but are not limited to, surgical instruments, medical implants, dental implants, dentures, prosthetics, biosensors, environmental sensors (e.g., for water or air quality, etc.), optical devices, and contact lenses. Non-medical surfaces include industrial surfaces (e.g., internal or external surfaces of pipes, tanks, reservoirs, machine parts, and the like), building parts and equipment, transportation devices (e.g., boats or cars), flooring, and any other surface where a biofilm has undesirably formed.

Compositions including the nanoparticles and/or microparticles for disrupting biofilms on surfaces may vary depending on the application and the thickness, type, and quantity of the biofilm on the surface. However, in some embodiments, such methods use compositions that include particles at a concentration in a range of about $1\times10^8$ particles/ml to about $1\times10^{12}$ particles/ml. In some embodiments, compositions include nanoparticles and/or microparticles suspended in water or an aqueous buffer. Other components may be added to the composition to facilitate biofilm removal or otherwise clean the object. For example, in some cases, an antimicrobial agent, cleanser, surfactant, and the like may be included in the nanoparticle and/or microparticle composition.

In some embodiments, a surface with a biofilm, or the entire object including the surface with the biofilm, is placed in an ultrasonic bath (e.g., fully immersed) that includes a nanoparticle and/or microparticle composition. Such sonication baths can range in size and particle concentration depending on the application. In some embodiments, the bath includes particles at a concentration in a range of about $1\times10^8$ particles/ml to about $1\times10^{12}$ particles/ml. The term "bath" is not limited in size, and in some embodiments, the bath may be relatively large (e.g., 50 L for cleaning a large device), and in some embodiments, the bath may be relatively small. For example, a "bath" for cleaning contact lenses may only contain about 5 to 10 ml of particle solution.

While in the bath, the object/device may undergo mechanical shearing e.g., via sonification. The duration and frequency of the sonication may vary depending on the device/object and the thickness, type, and quantity of the biofilm on the surface. In some embodiments, the surface with a biofilm thereon may be sonicated in the bath comprising the nanoparticle and/or microparticle composition for a time in a range of about 1 minute to about 120 minutes, including for a time in a range of about 1 minute to about 60 minutes, about 1 minute to about 45 minutes, and about 1 minute to about 30 minutes. In some embodiments, methods for disrupting biofilms on surfaces use ultrasonic frequencies in a range of about 5 kHz to about 100 MHz, including a range of about 5 kHz to about 80 kHz, a range of about 5 kHz to about 50 kHz, and a range of about 10 kHz to about 40 kHz, depending on the size of the object and the resolution of the features of the objects (e.g., objects with very fine features may require higher frequencies). The temperature of the ultrasonic bath may also vary. In some embodiments, the temperature of the nanoparticle and/or microparticle composition in the bath is in a range of about 4° C. to about 100° C., including in a range of about 10° C. to about 80° C., in a range of 10° C. to about 50° C., and in a range of about 20° C. to about 40° C.

In some embodiments, an ultrasonic probe or other handheld device may be used to disrupt a biofilm on a surface. In some embodiments, an ultrasonic probe (e.g., a piston transducer or array transducer) can be acoustically coupled to the biofilm on the surface via the nanoparticle and/or microparticle composition and can emit ultrasound pulses such that the nanoparticles and/or microparticles are activated and vaporized to release mechanical energy to disrupt the biofilm. In some embodiments, there are minimal or no air gaps between the surface and the particle composition. In some embodiments, the ultrasonic probe pulses used to disrupt the biofilm have a frequency in a range of about 5 kHz to about 100 MHz, including in a range of about 10 kHz to about 90 MHz, a range of about 20 kHz to about 80 kHz, a range of about 30 kHz to about 70 kHz, and a range of about 40 kHz to about 60 kHz.

In some embodiments, once sonification has been completed and the biofilm is suitably disrupted, the object may then be cleaned or washed to remove the disrupted microbial load or biofilm. Such cleaning agents may vary depending on the object/device and the biofilm, and in some embodiments, such agents may include water or an aqueous buffer, cleansers commonly used for the surface material, and/or other antimicrobial agents or cleansers. In some embodiments, once sonification has been completed, no further cleaning is necessary.

Also provided herein are methods of using of nanoparticles and/or microparticles to treat a surface to prevent growth of a biofilm. In some embodiments, the nanoparticle and/or microparticle solution can be applied to the surface of an object (e.g., table top), or the nanoparticles and/or microparticles can be a part of a water bath in which an object is placed. In some embodiments, the surface to be treated, or an object including the surface, are placed in an ultrasonic bath (e.g., fully immersed) that includes the nanoparticle and/or microparticle composition. Such sonication baths can range in size and concentration of particles depending on the surface, but in some embodiments, the bath includes particles at a concentration in a range of about $1 \times 10^8$ particles/ml to about $1 \times 10^{12}$ particles/ml. The temperature of the ultrasonic bath may also vary. In some embodiments, the temperature of the nanoparticle and/or microparticle solution in an ultrasonic bath may be in a range of about 4° C. to about 100° C., including in a range of about 10° C. to about 80° C., in a range of 10° C. to about 50° C., and in a range of about 25° C. to about 50° C.

In some embodiments, an ultrasonic probe (e.g., a piston transducer or array transducer) can be acoustically coupled to the surface via the nanoparticle and/or microparticle composition and emit ultrasound pulses. Alternatively, external ultrasonic transducers can be mounted to an object (e.g., large table or pipe) coated with of nanoparticles and/or microparticles and sonicated. In some embodiments, there are minimal or no air gaps between the surface and the particle composition. The mechanical shearing techniques, including sonification, may cause the nanoparticles and/or microparticles at the surface to oscillate, cavitate, and/or vaporize to release mechanical energy that creates nano- and/or micro-sized pores on the surface. The micro- and/or nano-sized pores may act to prevent adhesion of microorganisms such as bacteria and prevent the formation of biofilm structures on the surface.

In some embodiments, the objects may be sonicated for a time in a range of about 1 minute to about 120 minutes, including for a time in a range of about 1 minute to about 60 minutes, about 1 minute to about 45 minutes, and about 1 minute to about 30 minutes. In some embodiments, methods for preventing or minimizing biofilms on surfaces use ultrasonic frequencies in a range of about 5 kHz to about 100 MHz, including in a range of about 10 kHz to about 90 MHz, a range of about 20 kHz to about 80 kHz, a range of about 30 kHz to about 70 kHz, and a range of about 40 kHz to about 60 kHz, depending on the size of the object and the resolution of the features of the objects.

Methods of Using Nano- or Microparticles on or in the Body

In some embodiments of the invention, methods of using nanoparticles and/or microparticles to disrupt biofilms on or in a body of a human or animal (also referred to as a "subject") are provided. Such methods include contacting a surface on or in the body with the nanoparticles and/or microparticles, and applying a mechanical shearing technique to the surface to disrupt the biofilm on or in the body. In some embodiments of the invention, nanoparticles and/or microparticles may be used to decrease or remove a biofilm from wounds or infections of the skin.

Nanoparticle and/or microparticle compositions for use in disrupting biofilms on or in the body may vary depending on the use. For example, in some embodiments, nanoparticle and/or microparticle compositions for application on skin or for wound or infection care may be in the form of cream, foam, gel, or aerosolized spray. The compositions may further include components known to be useful in skin care or wound care, including, for example, triethanolamine, lanolin, glycerin, glycerol, propylene glycol, polyethylene glycol, antimicrobial agents, and the like. In some embodiments, compositions for application on the skin and/or wounds include particles at a concentration in a range of about $1 \times 10^8$ particles/ml to about $1 \times 10^{12}$ particles/ml.

In some embodiments of the invention, the nanoparticle and/or microparticle composition is applied so that a body surface (including skin and/or a wound) or biofilm is completely covered with the composition, and in some embodiments, there are minimal or no air gaps between the surface and the composition. Once the nanoparticle and/or microparticle composition is applied, the nanoparticles and/or microparticles may be activated by a mechanical shearing technique and oscillated, cavitated and/or vaporized to release mechanical energy to disrupt the biofilm and/or kill at least some microorganisms within the biofilm. In some embodiments, an ultrasonic probe (e.g., a piston transducer or array transducer) can be acoustically coupled to the wound via the nanoparticle and/or microparticle composition and emit ultrasound pulses, thereby activating the particles. In some embodiments, the ultrasonic probe pulses used to disrupt the biofilm have a frequency in a range of about 5 kHz to about 100 MHz, including in a range of about 10 kHz to about 90 MHz, a range of about 20 kHz to about 80 kHz, a range of about 30 kHz to about 70 kHz, and a range of about 40 kHz to about 60 kHz. In some embodiments, the body surface, including a wound and/or infected skin, can then be wiped or washed clean to remove the disrupted microbial biofilm load. Cleansers or other antimicrobial agents may also be applied for removal and/or prevention of further biofilm formation.

In some embodiments of the invention, in addition to, or in lieu of, disrupting a biofilm on the skin of an individual, the nanoparticle and/or microparticle compositions may be used to disrupt and/or remove superficial dermal layers of a subject for the purpose of exfoliation or preparation of the skin. In some embodiments, such methods may provide improved absorption of moisturizers or other creams. In some embodiments, such methods may be useful to treat or prevent acne and/or psoriasis. The same procedures described above with reference to disruption of biofilm on skin and/or a wound may be used to disrupt and/or remove dermal layers.

Also provided according to embodiments of the invention are methods of using nanoparticles and/or microparticles to disrupt and/or remove biofilm from teeth, gums, and wounds inside of the mouth (e.g., from a root canal). Oral compositions that include the nanoparticles and/or microparticles may vary depending on the use. However, in some embodiments, nanoparticle and/or microparticle compositions for oral care applications may be in the form of a mouthwash, rinse, paste, ointment, and the like. The compositions may further include components known to be useful in oral care or oral wound care. In some embodiments, such compositions include particles at a concentration in a range of about $1 \times 10^8$ particles/ml to about $1 \times 10^{12}$ particles/ml. In some embodiments, the nanoparticle and/or microparticle composition is applied so that biofilm in the mouth is covered, and in some cases, there are minimal or no air gaps between the biofilm in the mouth and the nanoparticle and/or microparticle composition.

Once the oral care composition has contacted the surface of the mouth with the biofilm, the nanoparticles and/or microparticles may be activated by a mechanical shearing technique and oscillated, cavitated, and/or vaporized to release mechanical energy to disrupt the biofilm and/or kill at least some microorganisms within the biofilm. In some embodiments, an ultrasonic probe (e.g., a piston transducer or array transducer) can be acoustically coupled to the wound via the nanoparticle and/or microparticle composition and emit ultrasound pulses such that the nanoparticles and/or microparticles are activated. In some embodiments, the ultrasonic probe pulses used to disrupt the biofilm may have a frequency in a range of about 5 kHz to about 100 MHz, including in a range of about 10 kHz to about 90 MHz, a range of about 20 kHz to about 80 kHz, a range of about 30 kHz to about 70 kHz, and a range of about 40 kHz to about 60 kHz. In some embodiments, the ultrasonic probe is part of or integrated with an ultrasonic tooth cleaner. In some embodiments, the teeth, gums, and/or oral wounds may be wiped or washed clean to remove the disrupted microbial biofilm load. In some embodiments, water may be used to clean the disrupted microbial biofilm load, but in some embodiments, application of oral cleansers, mouthwashes, pastes, and other antimicrobial preparations may be useful for cleansing and further prevention of biofilm formation.

Methods of Removing, Disrupting, or Preventing Biofilms in Hydroponic Systems

Provided according to further embodiments of the invention are methods for removing, disrupting, and/or preventing the formation of biofilms in hydroponic systems. As described herein, nanoparticle and/or microparticle compositions may be provided to at least one surface (e.g., of a hydroponic system) and upon the application of mechanical shearing energy, the nanoparticles and/or microparticles may oscillate, cavitate, and/or vaporize, thus disrupting a biofilm on the surface and/or killing at least some microorganisms in the biofilm. Techniques described herein may be used for such methods.

Additionally, in some embodiments of the invention, the formation of biofilms on surfaces of hydroponic systems may be prevented or decreased by contacting at least one surface of the hydroponic system with a nanoparticle and/or microparticle composition of the invention, and then applying a relatively low power pulse of ultrasonic energy to the particles to cause stable and/or inertial cavitation of the particles. With such stable cavitation, the shell of the particles may remain intact, but the oscillation of the particles at the hydroponic surfaces may prevent growth of microorganisms and/or a biofilm. In some embodiments, the pressure of the low power pulse is in a range of about 50 to about 5000 kPa, including in range of about 50 kPa to about 100 kPa, about 100 kPa to about 1000 kPa, about 1000 kPa to about 3000 kPa, and about 3000 kPa to about 5000 kPa. The ultrasonic pulses provided to the hydroponic system can be continuous or intermittent (e.g., every 0.5, 1, 2, 3, 4, 5, 10, 20, 30 minutes or more). In some embodiments, the inertial or stable cavitation may reduce or prevent the growth and adhesion of bacteria, thus preventing the growth and propagation of biofilm. In some embodiments, the pressure of the pulses should be low enough to prevent damage to the plant root system, yet high enough to stimulate oscillation of the nanoparticles and/or microparticles.

In some embodiments of the invention, hydroponic water systems may use a relatively low concentration of nanoparticles and/or microparticles. In some embodiments, such systems use particle compositions having a concentration in a range of about $1 \times 10^3$ particles/ml to about $1 \times 10^{10}$ particles/ml. In some embodiments of the invention, the ultrasonic pulse in the hydroponic system may have 1 to about 1000 cycles per burst, including 1 to about 500, 1 to about 200, and 1 to about 100 cycles per burst. In some embodiments, the duty cycle (also known as the pulse ratio) is in a range of about 1 to about 100%, including about 1 to about 50%, and about 1 to about 25%. In some embodiments, the frequency of the ultrasonic burst is in a range of about 5 kHz to about 100 MHz, including in a range of about 10 kHz to about 90 MHz, a range of about 20 kHz to about 80 kHz, a range of about 30 kHz to about 70 kHz, and a range of about 40 kHz to about 60 kHz.

In some embodiments, the ultrasonic pulses can be pulsed at more than one frequency. For example, the system may be pulsed at a dual frequency: a first frequency to promote plant growth and a second frequency to promote cavitation and discourage bacterial/biofilm growth. In some embodiments, the hydroponic water system has a continuously flowing particle solution to replenish nanoparticle and/or microparticle concentrations. In some embodiments, the hydroponic system may further include antimicrobial agents that are compatible with the plants used in the hydroponic system.

Methods for Removing or Disrupting Biofilms on Agricultural Products

Provided according to further embodiments of the invention are methods for removing, disrupting, and/or preventing the formation of biofilms on agricultural products, including fruits, vegetables, grains, other crops, and the like. As described herein, nanoparticle and/or microparticle compositions may be provided to at least one surface (e.g., of an agricultural product) and upon the application of mechanical shearing energy, the nanoparticles and/or microparticles may oscillate, cavitate, and/or vaporize, thus disrupting a biofilm on the surface and/or killing at least some microorganisms in the biofilm. Techniques described herein may be used for such methods.

Additionally, provided herein are methods of using nanoparticle and/or microparticle compositions of the invention to decrease or prevent biofilm formation on agricultural products, such as, for example, produce. Compositions for such agriculture use may vary depending on the use. However, in some embodiments, nanoparticle and/or microparticle compositions for treating agriculture products may be in the form of an aqueous solution, including water or a buffered solution. The compositions may further include components known to be useful in treating agricultural products, including suitable food-safe antimicrobial agents. In some embodiments, such compositions include particles at a concentration in a range of about $1 \times 10^8$ particles/ml to about $1 \times 10^{12}$ particles/ml.

In some embodiments, agricultural products can be immersed in a water bath containing a nanoparticle and/or microparticle solution. In some embodiments of the invention, the formation of biofilms on agricultural products may be prevented or decreased by contacting at least one surface of the product with a nanoparticle and/or microparticle composition of the invention, and then applying a relatively low power pulse of ultrasonic energy to the particles in the composition to promote stable and/or inertial cavitation of the particles. With such stable cavitation, the shell of the particles may remain intact, but the oscillation of the particles at the surface may prevent growth of bacteria and/or a biofilm. In some embodiments, the pressure of the low power pulse is in a range of about 50 to about 5000 kPa, including in range of about 50 kPa to about 100 kPa, about 100 kPa to about 1000 kPa, about 1000 kPa to about 3000 kPa, and about 3000 kPa to about 5000 kPa. The ultrasonic pulses provided to the agricultural products can be continuous or intermittent (e.g., every 0.5, 1, 2, 3, 4, 5, 10, 20, 30 minutes or more). In some embodiments, the inertial or stable cavitation may reduce or prevent the growth and adhesion of bacteria, thus preventing the growth and propagation of biofilm. The pressure should be low enough to prevent damage to the agricultural products (e.g., produce), yet high enough to stimulate oscillation of the nanoparticles and/or microparticles.

In some embodiments of the invention, the ultrasonic pulse used in a bath for agricultural products may have 1 to about 1000 cycles per burst, including 1 to about 500, 1 to about 200, and 1 to about 100 cycles per burst. In some embodiments, the duty cycle (also known as the pulse ratio) is in a range of about 1 to about 100%, including about 1 to about 50%, and about 1 to about 25%. In some embodiments, the frequency of the ultrasonic burst is about 5 kHz to about 100 MHz, including in a range of about 10 kHz to about 90 MHz, a range of about 20 kHz to about 80 kHz, a range of about 30 kHz to about 70 kHz, and a range of about 40 kHz to about 60 kHz. In some embodiments, the ultrasonic pulses can be pulsed at more than one frequency. For example, the system may be pulsed at a dual frequency: a first frequency to promote agricultural product quality and a second frequency to promote cavitation and discourage bacterial/biofilm growth. The baths may further include anti-biofilm chemical agents that are compatible with the agricultural products. Such agents may also be applied before or after the sonication bath.

Removing or Disrupting Biofilms in Microbial Fuel Cells

Provided according to further embodiments of the invention are methods for removing, disrupting, and/or preventing the formation of biofilms on or in microbial fuel cells. As described herein, nanoparticle and/or microparticle compositions may be provided to at least one surface (e.g., of the microbial fuel cell) and upon the application of mechanical shearing energy, the nanoparticles and/or microparticles may oscillate, cavitate, and/or vaporize, thus disrupting a biofilm on the surface and/or killing at least some microorganisms in the biofilm. Techniques described herein may be used for such methods.

Also provided according to embodiments of the invention are methods of using nanoparticle and/or microparticle compositions for decreasing or preventing biofilms in microbial fuel cells. Compositions for microbial fuel cells vary depending on the use. However, in some embodiments, nanoparticle and/or microparticle compositions for use in microbial fuel cells may be in the form of an aqueous solution, including in water or a buffered solution. In some embodiments, compositions for use in microbial fuel cells may include particles at a concentration in a range of about $1 \times 10^3$ particles/ml to about $1 \times 10^8$ particles/ml.

Microbial fuel cells may contain ultrasonic devices that emit relatively low pressure pulses to promote inertial or stable cavitation of the nanoparticles and/or microparticles in compositions used therein. The inertial or stable cavitation may prevent the growth and adhesion of bacteria, thus preventing the growth and adhesion of biofilm architectures in the fuel cell. The pressure should be low enough to prevent damage to the useful microbes in the microbial fuel cell, yet high enough to stimulate oscillation in the microparticles and/or nanoparticles. With such stable cavitation, the shell of the particles may remain intact, but the oscillation of the particles at the fuel cell surfaces may prevent growth of bacteria and/or a biofilm. In some embodiments, the pressure of the low power pulse is in a range of about 50 to about 5000 kPa, including in range of about 50 kPa to about 100 kPa, about 100 kPa to about 1000 kPa, about 1000 kPa to about 3000 kPa, and about 3000 kPa to about 5000 kPa. The ultrasonic pulses provided to the microbial fuel cells can be continuous or intermittent (e.g., every 0.5, 1, 2, 3, 4, 5, 10, 20, 30 minutes or more).

In some embodiments of the invention, the ultrasonic pulse used in microbial fuel cells may have 1 to about 1000 cycles per burst, including 1 to about 500, 1 to about 200, and 1 to about 100 cycles per burst. In some embodiments, the duty cycle (also known as the pulse ratio) is in a range of about 1 to about 100%, including about 1 to about 50%, and about 1 to about 25%. In some embodiments, the frequency of the ultrasonic burst is about 5 kHz to about 100 MHz, including in a range of about 10 kHz to about 90 MHz, a range of about 20 kHz to about 80 kHz, a range of about 30 kHz to about 70 kHz, and a range of about 40 kHz to about 60 kHz. In some embodiments, the ultrasonic pulses can be pulsed at more than one frequency. For example, the system may be pulsed at dual frequency: a first frequency to promote fuel cell processes and a second frequency to promote cavitation and discourage bacterial/biofilm growth. The microbial fuel cell may further include anti-biofilm chemical agents that are compatible with microbial fuel cells. In some embodiments, the microbial fuel cells may also have a continuously flowing particle solution to replenish nanoparticle and/or microparticle concentrations.

Other Methods of Preventing Biofilm Formation

While the methods of using the stable or inertial cavitation of the particles to decrease or prevent microbial adhesion and/or biofilm formation has been described with respect to hydroponic systems, agricultural products, and microbial systems, the methods could be use with other systems in which a particle concentration can be replenished or maintained. As such, in some embodiments, provided are methods of preventing or decreasing formation of a biofilm on a surface, wherein the method comprises contacting the surface with a composition comprising the microparticles or nanoparticles of the invention, and applying a mechanical shearing technique at a power sufficiently low that the particles undergo inertial or stable cavitation at surfaces, thereby reducing or eliminating microbial adhesion and/or biofilm formation at the surfaces. Such methods can use the parameters and techniques described above with respect to the hydroponic, agricultural product, and/or microbial fuel cell methods.

Having described the present invention, the same will be explained in greater detail in the following example, which is included herein for illustrative purposes only, and which is not intended to be limiting to the invention.

Example

Figure 1:
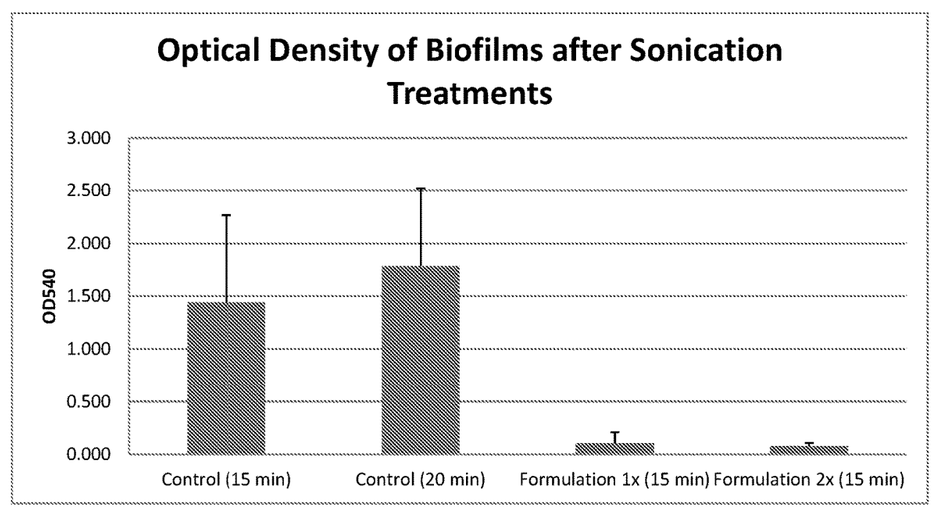

The gram positive bacteria, *Streptococcus mutans*, was propagated in standard optically clear 96-well culture plates, resulting in the formation of a biofilm on the bottom surface. Multiple cohorts of samples were treated with ultrasound (40 kHz frequency in a Branson 1800 ultrasonic bath) with and without the addition of nanodroplets. The nanodroplets used had particle sizes in a range of 100-300 nm, with the average particle size at approximately 200 nm. The core of the nanodroplet was perfluorobutane and the shell was composed of a DSPC/DSPE-PEG2K phospholipid mix. Control samples (treated with no nanodroplets) were treated for 15 and 20 minutes. Experimental samples were treated for 15 minutes using two different nanodroplet concentrations. A 1× solution included nanodroplets at a concentration of about $3.75 \times 10^9$ particles/L, and the 2× solution included nanodroplets at concentration of about $5 \times 10^9$ particles/ml. All samples were stained with a crystal violet stain and quantified using spectrophotometry at 540 nm wavelength. The results demonstrate significant improvement in biofilm disruption using nanodroplets compared to conventional sonication (See FIG. 1). This data shows a significant benefit in using nanodroplet-mediated sonication for biofilm disruption.

The foregoing is illustrative of the present invention, and is not to be construed as limiting thereof. The invention is defined by the following claims, with equivalents of the claims to be included therein.

We claim:

1. A method of extracting an analyte from a sample containing a biofilm, the method comprising:
   a) contacting the sample with nanoparticles and/or microparticles, wherein the nanoparticle and/or microparticles comprise an inert liquid and/or gas core surrounded by an enclosing substance;
   b) applying a mechanical shearing technique to the sample to disrupt the biofilm; and
   c) extracting the analyte from the sample, wherein the analyte is a biomolecule.

2. The method of claim 1, wherein the mechanical shearing technique is ultrasound or rotary homogenization.

3. The method of claim 1, wherein the sample is saliva, mucus, feces, or a skin wound.

4. The method of claim 1, wherein the sample is a plant or plant part, a soil sample, and/or a water sample.

5. The method of claim 1, wherein the biomolecule is a protein, nucleic acid, metabolite, or any combination thereof.

6. The method of claim 1, wherein the biomolecule is extracted from a microorganism that produced the biofilm and/or forms part of the biofilm.

7. The method of claim 6, wherein the microorganism is a bacterium or a fungus.

8. The method of claim 1, wherein the inert gas comprises at least one perfluorocarbon with a boiling point below 25° C.

9. The method of claim 8, wherein the at least one perfluorocarbon comprises a decafluorobutane (DFB) and/or an octafluoropropane (OFP).

10. The method of claim 1, wherein the nanoparticles and/or the microparticles comprise a shell comprising at least one of a lipid, protein, polymer, gel, surfactant, peptide, or sugar.

11. The method of claim 1, wherein the average diameter of the nanoparticles and/or microparticles is less than one micron.

12. The method of claim 1, wherein applying a mechanical shearing technique comprises applying sonication energy having a frequency in the range from 0.01 MHz to 100 MHz.

13. The method of claim 1, wherein the sample is a biological sample.

14. The method of claim 13, wherein the biological sample is from a human.

15. The method of claim 13, wherein the biological sample is a clinical sample.

16. The method of claim 1, wherein the biomolecule is an intracellular biomolecule or an extracellular biomolecule.

17. The method of claim 1, further comprising contacting the sample with an anti-microbial agent or another chemical agent.

18. The method of claim 1, wherein the nanoparticles and/or the microparticles comprise a phospholipid shell.

19. The method of claim 1, wherein a majority of the nanoparticles and/or the microparticles have a diameter from 50 nm to 500 nm.

* * * * *